United States Patent
Schuring

(10) Patent No.: US 10,947,852 B2
(45) Date of Patent: Mar. 16, 2021

(54) TRIBRID WIND TURBINE BLADE

(71) Applicant: LM WP PATENT HOLDING A/S, Kolding (DK)

(72) Inventor: Roel Schuring, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 723 days.

(21) Appl. No.: 14/895,409

(22) PCT Filed: Jun. 18, 2014

(86) PCT No.: PCT/EP2014/062872
§ 371 (c)(1),
(2) Date: Dec. 2, 2015

(87) PCT Pub. No.: WO2014/202689
PCT Pub. Date: Dec. 24, 2014

(65) Prior Publication Data
US 2016/0108736 A1 Apr. 21, 2016

(30) Foreign Application Priority Data
Jun. 20, 2013 (GB) .................................. 1311008

(51) Int. Cl.
*F03D 1/06* (2006.01)
*F01D 5/14* (2006.01)

(52) U.S. Cl.
CPC ........... *F01D 5/147* (2013.01); *F03D 1/0675* (2013.01); *F05B 2230/60* (2013.01);
(Continued)

(58) Field of Classification Search
CPC ........ F03D 5/147; F03D 1/0675; F01D 5/147; Y02P 70/50; F05B 2230/60; F05B 2240/302; Y02E 10/72
(Continued)

(56) References Cited

U.S. PATENT DOCUMENTS 8,012,299 B2 * 9/2011 Hancock ................. F03D 13/10
156/228
8,105,035 B2 * 1/2012 Bertelsen ............... H02G 13/00
29/889.7
(Continued)

FOREIGN PATENT DOCUMENTS

CN 201351582 Y 11/2009
EP 1 184 566 A1 6/2002
(Continued)

OTHER PUBLICATIONS

International Search Report dated Oct. 9, 2014 issued in corresponding International Application No. PCT/EP2014/062872.

*Primary Examiner* — Christopher Verdier
*Assistant Examiner* — Sabbir Hasan
(74) *Attorney, Agent, or Firm* — Nath, Goldberg & Meyer; Tanya E. Harkins; Jerald L. Meyer

(57) ABSTRACT

A tribrid wind turbine blade is described, wherein the blade is formed from three separate parts made using three different manufacturing approaches. A root section of the blade is formed by a load-bearing central spar having an aerodynamic shell or fairing fitted to the spar. A mainboard portion is formed from a load-bearing shell structure. A tip portion is formed as an integrally-formed element from a one-shot closed moulding process.

19 Claims, 8 Drawing Sheets

(52) U.S. Cl.
CPC ......... *F05B 2240/302* (2013.01); *Y02E 10/72* (2013.01); *Y02P 70/50* (2015.11)

(58) Field of Classification Search
USPC ...................................................... 416/223 R
See application file for complete search history.

(56) References Cited

U.S. PATENT DOCUMENTS

| | | | | |
|---|---|---|---|---|
| 8,186,964 | B2* | 5/2012 | Bell | ................ B29C 65/48 |
| | | | | 416/226 |
| 2010/0310379 | A1 | 12/2010 | Livingston | |
| 2011/0142667 | A1 | 6/2011 | Miebach | |
| 2012/0213642 | A1* | 8/2012 | Wang | ................ F03D 1/0675 |
| | | | | 416/232 |
| 2014/0369845 | A1* | 12/2014 | Ruijter | ................ F01D 5/141 |
| | | | | 416/224 |

FOREIGN PATENT DOCUMENTS

| | | | | |
|---|---|---|---|---|
| ES | 1184566 A1 * | 3/2002 | ............. | F03D 1/065 |
| WO | 03/078833 A1 | 9/2003 | | |
| WO | 2009/109619 A2 | 9/2009 | | |
| WO | 2012/007058 A1 | 1/2012 | | |
| WO | 2012/093136 A2 | 7/2012 | | |
| WO | 2013/092871 A1 | 6/2013 | | |

* cited by examiner

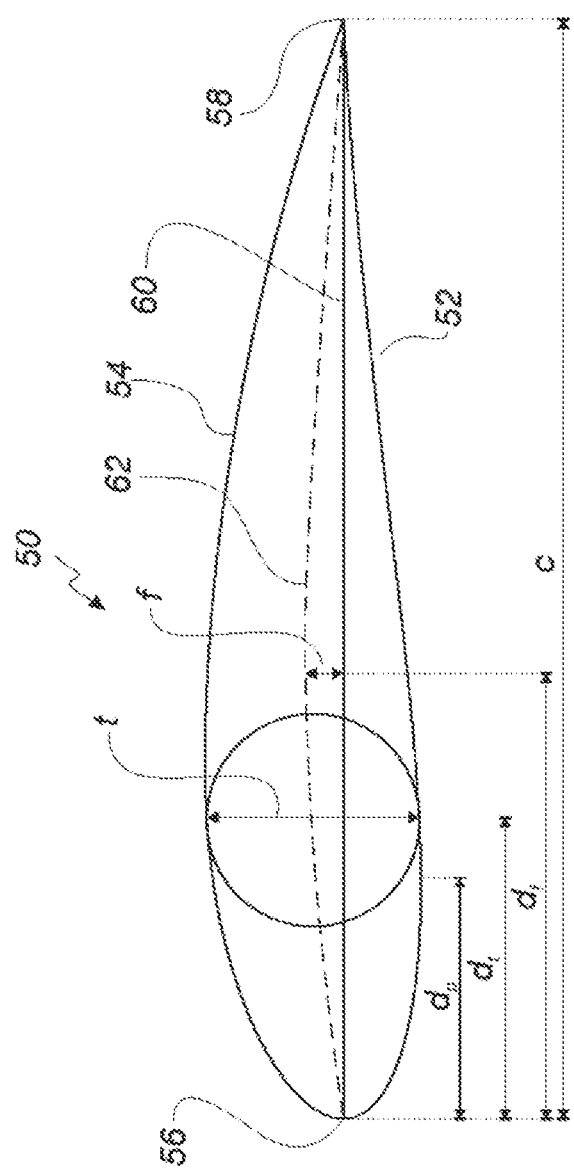
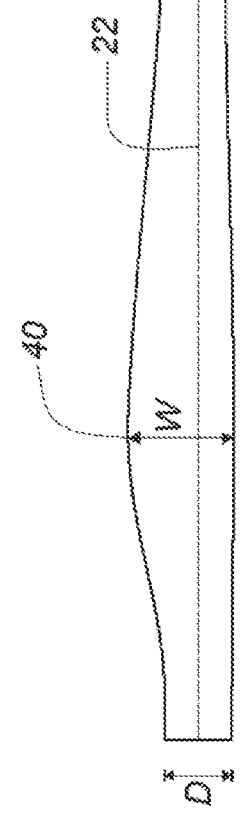
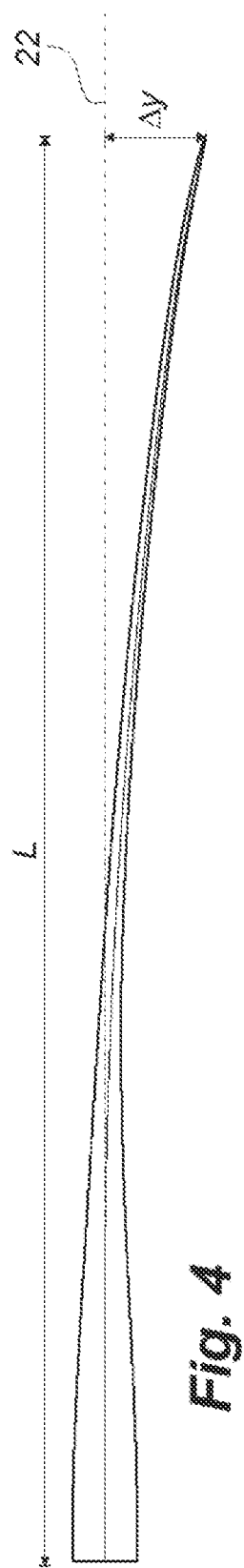
Fig. 3
Fig. 4

TRIBRID WIND TURBINE BLADE

This is a National Phase Application filed under 35 U.S.C. 371 as a national stage of PCT/EP2014/062872, filed Jun. 18, 2014, an application claiming the benefit of United Kingdom Application No. 1311008.5, filed Jun. 20, 2013, the content of each of which is hereby incorporated by reference in its entirety.

FIELD OF THE INVENTION

The present invention relates to a tribrid wind turbine blade, or a wind turbine blade formed from three separate components.

BACKGROUND OF THE INVENTION

In general, there are three separate industry-standard approaches to wind turbine blade manufacture.

The first approach involves the manufacture of wind turbine blade shells in one or more blade moulds, wherein load-bearing laminates are incorporated into the blade shells. The shells are bonded together to form the blade structure, wherein one or more shear webs are located internally of the bonded shells, to prevent buckling and to account for shear loads. This approach is favoured by numerous different blade manufacturers, including LM Wind Power A/S of Denmark.

The load-bearing shell approach provides a relatively simple and proven method for construction of the blade shells, but which can require a relatively complicated bonding operation to be performed to connect said shells together. Furthermore, detailed post-bonding surveying and inspection must be performed to ensure no defects have arisen in the blade structure during the manufacturing process.

The second approach provides for the construction of an internal load-bearing spar box or girder, which extends substantially along the length of the blade. A non-load-bearing aerodynamic fairing or shell is attached to the exterior of the spar box, to provide the airfoil profile of the blade. This approach is adopted by several blade manufacturers, most notably Vestas Wind Systems A/S of Denmark.

While the load-bearing spar approach can provide greater performance when absorbing the considerable bending forces of a wind turbine blade during operation, it requires a relatively complicated and time-consuming attachment of said aerodynamic fairings to the spar box exterior.

The third approach is the integral or one-shot forming procedure, wherein single-piece wind turbine blades are manufactured in a closed process using a closed outer mould and an expanding inner mould. This approach was devised by Bonus Energy A/S of Denmark.

The one-shot approach results in a blade having a relatively strong integrally-formed structure, without glue joints. However, the integral moulding presents a considerably demanding manufacturing process, including the challenge of removing the relatively large inner mould out through the relatively narrow blade root end.

It is an object of the invention to provide a new wind turbine blade design which provides advantages over prior art designs, while mitigating any negative effects of the blade design.

SUMMARY OF THE INVENTION

Accordingly, there is provided a wind turbine blade having a root portion, a mainboard portion, and a tip portion, wherein:

the root portion comprises at least one substantially load-bearing spar structure having at least one aerodynamic shell coupled to said spar structure;

the mainboard portion comprises a load-bearing aerodynamic shell; and the tip portion comprises an integrally-formed tip element.

By providing a wind turbine blade having such a tribrid construction, the advantages of different constructional approaches can be utilized in those areas of the blade where they provide the greatest impact and efficiencies. The relatively heavy-duty load-bearing spar can be used to bear the significant loads experienced at the root end of the wind turbine blade, and effectively transfer these loads to the hub of an associated wind turbine. The load-bearing shell structure of the mainboard section results in the most cost-effective and simplest manufacturing method for the primary aerodynamic portion of the blade. The use of an integrally-formed tip portion means that the blade can be provided without any adhesive bond lines in the tip element, resulting in significant weight savings at the blade tip end.

Preferably, said root portion, said mainboard portion, and said tip portion are provided as separate components assembled together to form said wind turbine blade.

It will be understood that the wind turbine blade comprises a tip end and a root end.

Preferably, the wind turbine blade exceeds 40 metres in length.

Preferably, said root portion forms approximately the inner third of the total length of the wind turbine blade, taken from the root end of the blade. Alternatively, said root portion forms approximately the inner 0-25% of the length of the wind turbine blade. In an additional or alternative aspect, said root portion forms the portion of the wind turbine blade from the root end of the blade to approximately the point of maximum chord of the blade.

Preferably, said mainboard portion forms approximately ⅔ of the total length of the blade. In one aspect, said mainboard portion forms approximately the middle 33-95% of the length of the wind turbine blade, taken from the root end of the blade. In an alternative aspect, said mainboard portion forms approximately the middle 25-95% of the length of the wind turbine blade. In an additional or alternative aspect, said mainboard portion forms the portion of the wind turbine blade from approximately the point of maximum chord of the blade to a point between approximately 75-95% along the length of the wind turbine blade from the root end, preferably between approximately 80-90%. In one aspect, the mainboard portion extends to a point approximately 85% along the length of the wind turbine blade from the root end.

Preferably, said tip portion forms approximately the outer 85-100%, of the length of the wind turbine blade, preferably 90-100%, further preferably 95-100%, further preferably 97-100%, taken from the root end of the blade. In one aspect, the tip portion may comprise a relatively short length compared to the total length of the blade, e.g. the tip portion may be approximately 1-5 metres in length, preferably 2 metres, for a blade having a total length of over 50 metres, preferably over 60 metres, further preferably over 70 metres.

In an alternative configuration, said root portion, said mainboard portion, and said tip portion each form approximately ⅓ of the length of the wind turbine blade. By providing each section of substantially similar lengths, accordingly the requirements for the transportation of the blade portions can be simplified and/or standardised. In one embodiment, said root portion, said mainboard portion, and said tip portion each comprise blade portions over 50 metres length, to form a wind turbine blade of over 150 metres in total length. However, it will be understood that the blade portions may be provided in any suitable length ratios.

It will be understood that preferably said root portion and said mainboard portion, and/or said mainboard portion and said tip portion, may be joined using any suitable mechanism, e.g. adhesive bonding, bolting, riveting, a snap-fit coupling, etc.

In a further aspect, the blade comprises at least one separate joining member inserted into the interior between said root portion and said mainboard portion, and/or said mainboard portion and said tip portion, wherein said at least one separate joining member provides a bonding surface between blade portions. Suitable adhesive may be applied between sections of the at least one separate joining member and the blade portions to provide for improved bonding and/or load bearing effects between adjacent blade portions. In a preferred aspect, said at least one separate joining member comprises a web member arranged to extend between opposed surfaces of the blade portions, e.g. a shear web. Such a web member may be provided as an I-web, a C-web, a spar box member, or any suitable construction.

In one embodiment, the wind turbine blade comprises at least one coupling member, wherein said coupling member is arranged to connect said root portion to said mainboard portion, and/or to connect said mainboard portion to said tip portion.

In the preferred embodiments of the invention, the portions of the blade are joined using an adhesive or bonding resin, without the need for a separate joining or coupling member.

It will be understood that said at least one coupling member may be provided as a separate coupling piece or mounting collar, or the at least one coupling member may be formed integrally with an end of at least one of the root, mainboard or tip portions. It will further be understood that the at least one coupling member may present an aerodynamic cross-sectional profile. Additionally or alternatively, at least one aerodynamic shell or fairing may be provided about the at least one coupling member to present an appropriate aerodynamic profile at the joint between two portions of the wind turbine blade. In an alternative aspect, the at least one coupling member may be provided as a coupling flange located in the interior of the at least one blade portion.

In one aspect, said mainboard portion comprises a connecting section located at the outer end of said mainboard portion, wherein said connecting section is shaped to couple with a first end of said tip portion.

Preferably, the outer surface of said connecting section is chamfered, wherein the first end of said tip portion is fitted around the exterior of said connecting section.

Alternatively, the inner surface of said connecting section is chamfered, wherein the first end of said tip portion is received within the interior of said connecting section.

It will be understood that the first end of said tip portion may be chamfered to couple with the connecting section of said mainboard portion, wherein the inner surface or the outer surface of the first end of said tip portion is chamfered to provide an appropriate mating surface with the respective outer surface or inner surface of said connecting section.

It will be understood that the tip portion is secured to the connecting section of the mainboard portion using any suitable connection mechanism, e.g. adhesive bonding, bolting, riveting, etc. It will be further understood that the connecting section of the mainboard section may be shaped such that the cross-sectional profile of the connection section may be tapered inwardly or outwardly, to provide a suitable coupling zone to receive said first end of said tip portion within the interior of or around the exterior of the said connecting section. It will additionally be understood that any suitable joint configurations may be used, e.g. finger joints, dove-tail joints, etc.

In one aspect, the root portion comprises a load-bearing internal spar having at least one external aerodynamic shell fitted to the exterior of said spar.

The shell may comprise a light-weight aerodynamic fairing or cover which can define an aerodynamic profile about the internal spar, which may have a substantially rectangular cross-sectional profile. The fairing or cover may be formed from a plurality of separate fairing elements which can be assembled about the internal spar.

In one aspect, the fairing or cover may comprise a pressure-side fairing substantially defining a pressure side of an aerodynamic profile and a suction-side fairing substantially defining a suction side of an aerodynamic profile.

In an alternative aspect, the fairing or cover may comprise a leading-edge fairing to define a leading edge of an airfoil profile and a trailing-edge fairing to define a trailing edge of an airfoil profile. In a further aspect, at least one bridging shell or fairing may be provided, the bridging shell or fairing extending between the opposed leading and trailing edge shells, to define the surface of an airfoil profile between the leading and trailing edges of the airfoil.

It will be understood that the free ends of said shells or fairings may abut or overlap each other, to define a closed shell extending about the internal load-bearing spar.

In an alternative aspect, the root portion comprises a load-bearing central spar having an aerodynamic leading edge shell and/or an aerodynamic trailing edge shell fitted to said load-bearing central spar.

In this embodiment, the central spar may be shaped to effectively form part of the exterior surface of the wind turbine blade at the blade root end, where the aerodynamic properties of the root portion can be improved through the addition of separate leading edge and/or trailing edge shells to the central spar to define an aerodynamic cross-sectional profile at the root end.

In one embodiment, the central spar comprises a substantially circular cross-sectional shape at the blade root end, and transitions to a substantially rectangular cross-sectional shape at the interface between the root portion and the mainboard portion.

It will be understood that the at least one aerodynamic shell may be coupled to the load-bearing spar structure using any suitable attachment methods, e.g. adhesive bonding, bolting, riveting, complimentary snap-fit connections defined on the different elements, etc.

In an additional or alternative aspect, the root portion may comprise a plurality of rib elements mounted to said at least one substantially load-bearing spar structure, wherein said at least one aerodynamic shell is supported by said plurality of rib elements.

The rib elements may comprise a plurality of leading edge ribs and/or a plurality of trailing edge ribs, wherein the ribs are shaped to present an outline of a portion of a desired aerodynamic shape for the root portion of the blade. As the aerodynamic shell is carried by the rib elements, the shell may assume the profile of the desired shape at the root portion.

Preferably, the rib elements are provided as shaped rods. It will be understood that said rib elements may be formed from any suitable material, preferably composite material-based, preferably pultrusions.

In such an implementation, the aerodynamic shells may be provided as a relatively flexible material, which can be supported by the ribs to define the aerodynamic profile. By providing the aerodynamic shells as a flexible material supported by the internal ribs, this can provide for relatively easier transport and storage of the blade components, as the flexible material may be provided in the form of cylindrical rolls and not as a solid inflexible shell structure.

Preferably, said mainboard portion is formed from at least two blade shell sections coupled together to form an aerodynamic blade shell.

Preferably, said mainboard portion is formed from an upwind blade shell substantially defining an upwind or pressure-side surface of an airfoil profile and a downwind blade shell substantially defining a downwind or suction-side surface.

Preferably, said upwind and downwind blade shells have respective leading edge and trailing edge ends which are bonded together to form an airfoil shell.

Preferably, said blade shells are formed in respective complimentary open blade moulds.

Preferably, said blade shells comprise a load-bearing main laminate formed integral to said blade shell.

Preferably, said mainboard portion comprises at least one internal spar or web. Preferably said at least one internal spar or web extends between an internal surface of said upwind blade shell and an internal surface of said downwind blade shell, preferably between respective load-bearing main laminates of said blade shells.

It will be understood that said at least one internal spar or web may comprise any suitable structural element which can be used to bridge the space between the upwind and downwind shells in the mainboard portion, e.g. a C-web, an I-web, a spar box, etc.

Preferably, said tip portion comprises an integrally-formed aerodynamic tip shell.

It will be understood that the tip portion is formed without adhesive bond lines in the tip shell. Preferably, the tip portion is provided as a one-piece shell, preferably formed using a one-shot moulding process. The tip portion may be provided without an internal spar or web. Alternatively, the tip portion may be provided with internal spars or webs, which may be formed as part of a one-shot moulding process.

Preferably, the tip portion has a substantially cap-like shape, having a first end comprising a relatively wide opening which tapers or narrows towards the tip end of the tip portion.

As the tip portion is preferably formed using a one-shot integral moulding process, accordingly the formation of a wide-necked element avoids the primary issues with one-shot moulding techniques, and results in the provision of an element which does not require significant amounts of adhesive or internal reinforcement, resulting in considerable weight savings for the tip portion of the blade.

There is further provided a wind turbine comprising a wind turbine blade as described above.

There is also provided a method of manufacturing a wind turbine blade comprising the steps of:
providing a blade root portion by manufacturing a load-bearing spar structure and fitting at least one aerodynamic shell to said load-bearing internal spar structure;
providing a blade mainboard portion by manufacturing portions of a load bearing shell in a negative mould and assembling said portions of a load bearing shell to form said blade mainboard portion, preferably comprising at least one internal bridging spar or web extending between adjacent portions of said load bearing shell;
providing a blade tip portion by manufacturing a single tip element using an integral moulding procedure; and
assembling said blade root portion, said blade mainboard portion, and said blade tip portion to form a wind turbine blade.

DESCRIPTION OF THE INVENTION

Embodiments of the invention will now be described, by way of example only, with reference to the accompanying drawings, in which:

FIG. 3 shows a schematic view of an airfoil profile of the blade of FIG. 2;

FIG. 4 shows a schematic view of the wind turbine blade of FIG. 2, seen from above and from the side;

It will be understood that elements common to the different embodiments of the invention have been provided with the same reference numerals in the drawings.

Figure 1:
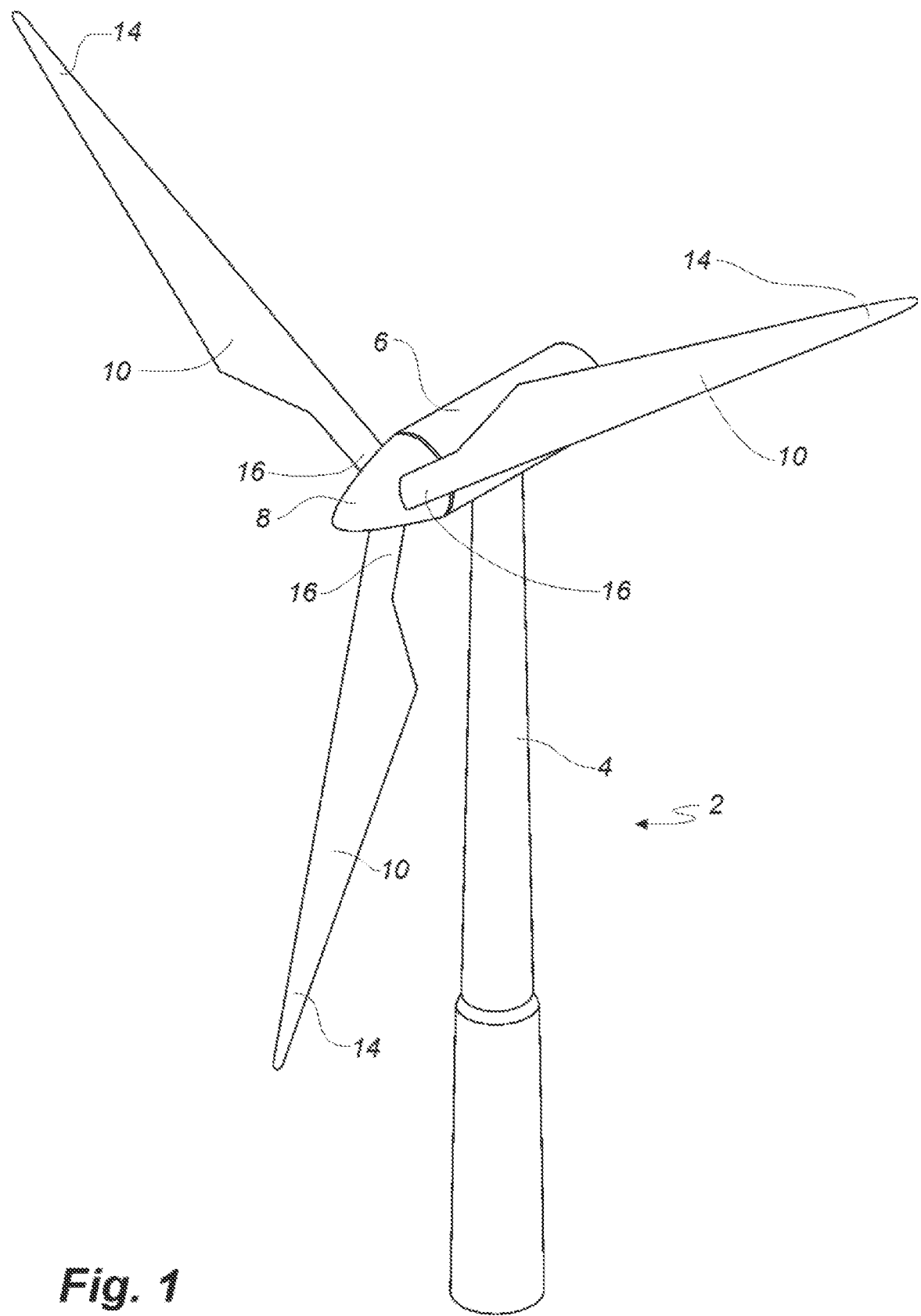
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
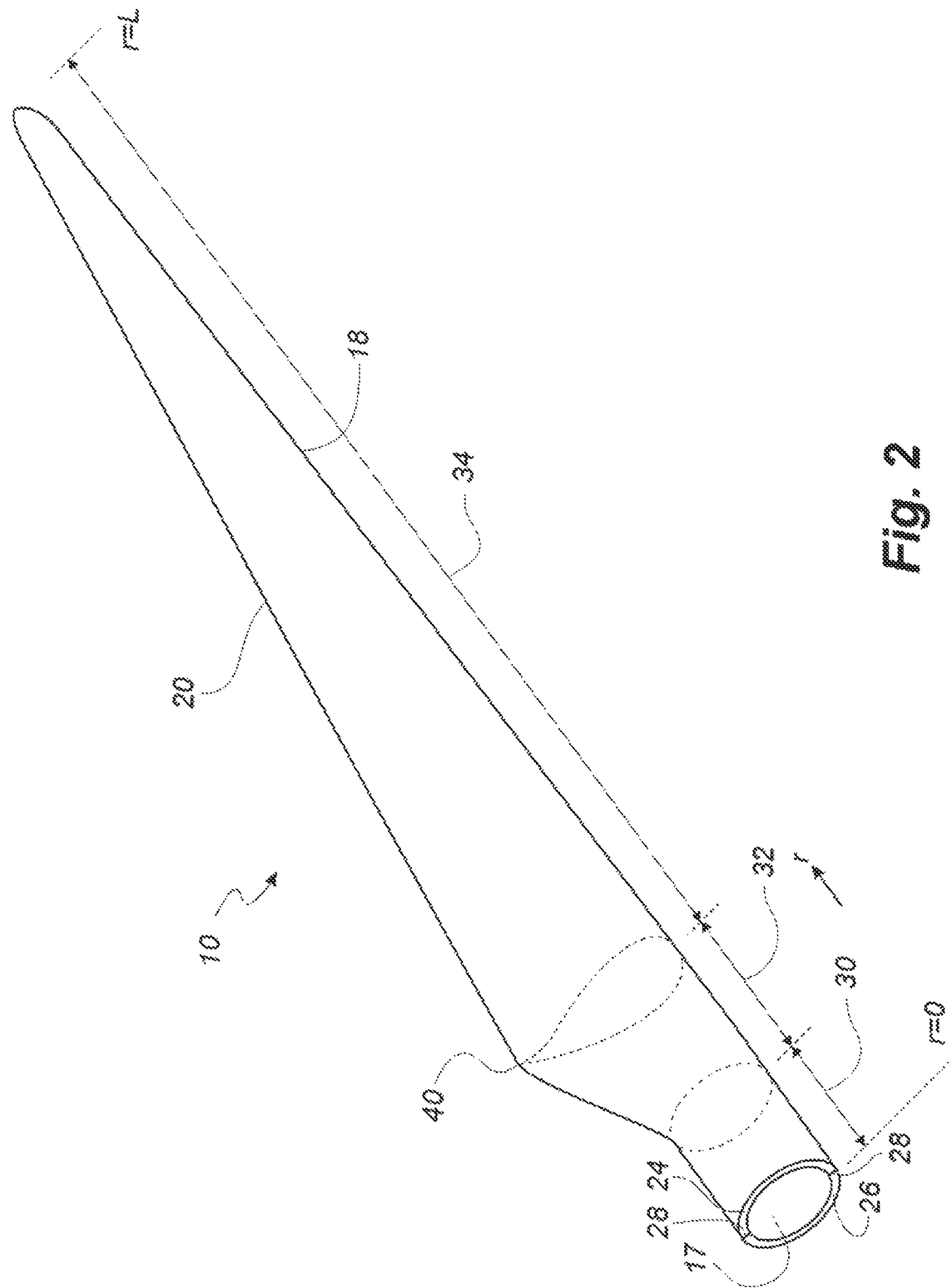
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

Modern wind turbine blades can often be in excess of 30 or 40 metres in length, having blade root diameters of several metres. Wind turbine blades are generally designed for relatively long lifetimes and to withstand considerable structural and dynamic loading.

Figure 5:
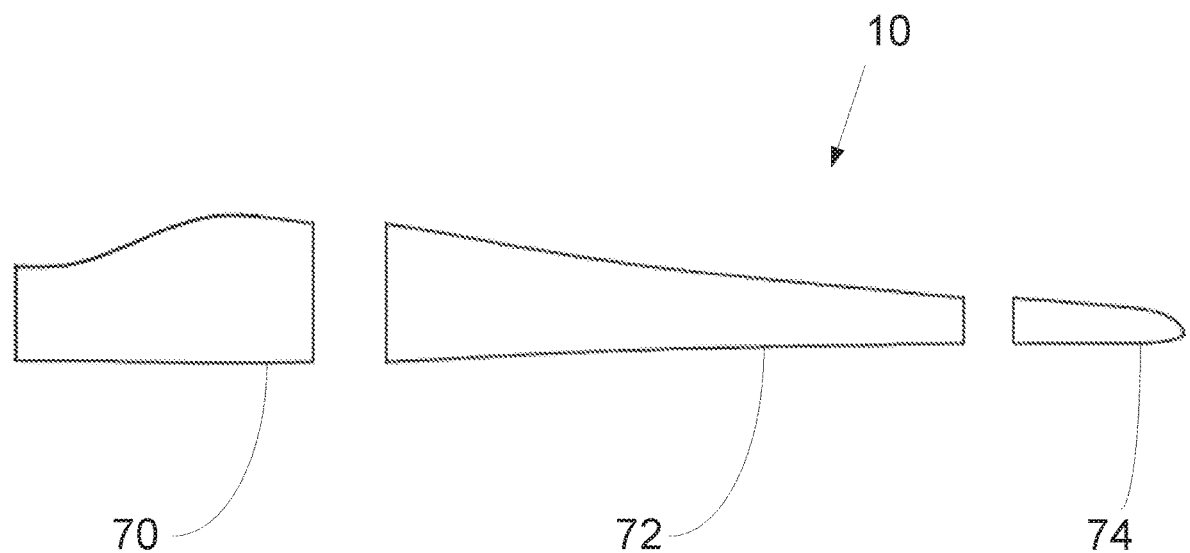
FIG. 5 illustrates an embodiment of tribrid blade according to the invention.
Figure 5:
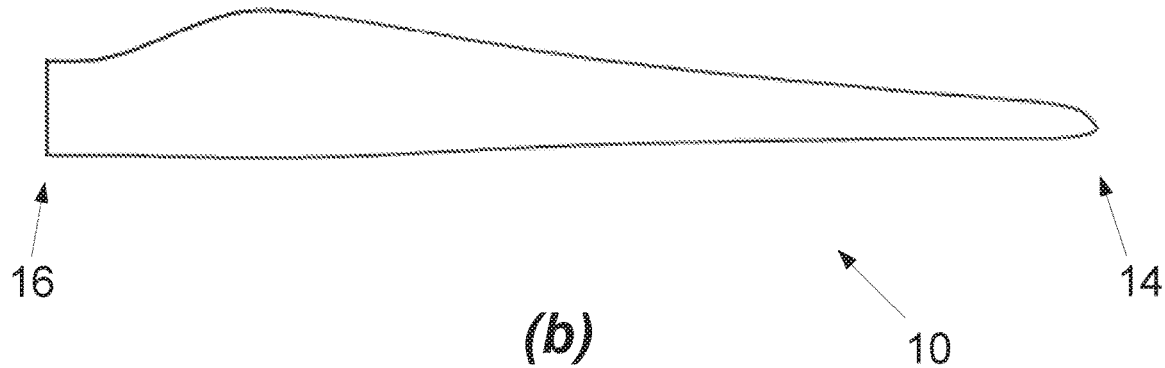

With reference to FIG. 5(a), a blade 10 according to the invention is formed as three separate sections or portions: a root section 70, a mainboard section 72, and a tip section 74.

In order to provide an improved blade construction, the root section 70 is formed as a blade section having a substantially load-bearing spar structure, the mainboard section 72 comprises a load-bearing aerodynamic shell, and the tip portion 74 comprises an integrally-formed tip element formed from an integral moulding or one-shot manufacturing process. Once the separate blade portions 70,72,74 are manufactured, the portions can be subsequently assembled to form the wind turbine blade 10, FIG. 5(b).

By providing such a tribrid or triple-hybrid blade construction, the particular advantages of three different manufacturing methods can be utilised at those locations of the blade where the advantages have the maximum impact, while reducing the negative aspects of the approaches.

At the root end, the load-bearing spar construction allows for the use of a structural spar box or spar girder specifically designed to absorb the considerable moments and bending forces experienced by the wind turbine blade during operation. Appropriate aerodynamic fairings or shells can be affixed to the spar box to provide for a suitable airfoil profile at the root end section of the blade. The root portion 70 of the blade 10 may comprise the inboard 33% of the length of the blade 10, and/or may extend from the root end 16 of the blade 10 to the location of the maximum chord of the blade 10, i.e. the shoulder 40. It will be understood that the root portion may or may not extend beyond the location of the maximum chord.

For the mainboard section 72, the use of a load-bearing shell construction means that an effective and proven blade construction can be utilised for the primary aerodynamic surfaces of the blade 10, and which can be implemented with minimum cost and manufacturing difficulty. The mainboard portion 72 can form approximately the middle two-thirds of the length of the wind turbine blade, taken from the root end of the blade, e.g. between 33-97% of the length of the blade from the root end. Additionally or alternatively, the mainboard section 72 forms the portion of the wind turbine blade from approximately the point of maximum chord of the blade to a point between approximately 75-95% along the length of the wind turbine blade from the root end 16, preferably between approximately 80-90%. In one aspect, the mainboard portion 72 extends to a point approximately 85% along the length of the wind turbine blade 10 from the root end 16.

For the tip end of the blade 10, as the separate tip portion 74 is formed using a one-shot process in a closed mould, this eliminates the existence of adhesive bond lines in the area of the blade tip end 14, reducing the weight of the blade due to adhesives. In addition, as the tip portion 74 is essentially an open-ended tapering element, there are no problems regarding the removal of an inner mould from the tip portion 74 after moulding.

It will be understood that the separate portions 70,72,74 may be joined using any suitable joining method, e.g. adhesive bonding, bolting, riveting, a snap-fit coupling, etc. Additionally or alternatively, the wind turbine blade 10 may comprise a coupling member (not shown) which is positioned between the root portion 70 and the mainboard portion 72, and/or between the mainboard portion 72 and the tip portion 74, the coupling member arranged to securely connect the respective blade portions together, e.g. as a coupling collar or flange, and/or an element arranged to couple between a load-bearing spar box and a load-bearing shell, and to effectively transfer the blade loads during operation between the blade portions. Additionally or alternatively, separate connecting elements may be positioned in the interior of the blade, extending between adjacent blade portions. The connecting elements may provide additional bonding surfaces between adjacent portions, for the use of adhesive bonds, bolting, riveting, etc. Preferably, said separate connecting elements are provided as web members, e.g. shear webs, which extend between opposed interior surfaces of the blade.

Figure 6:
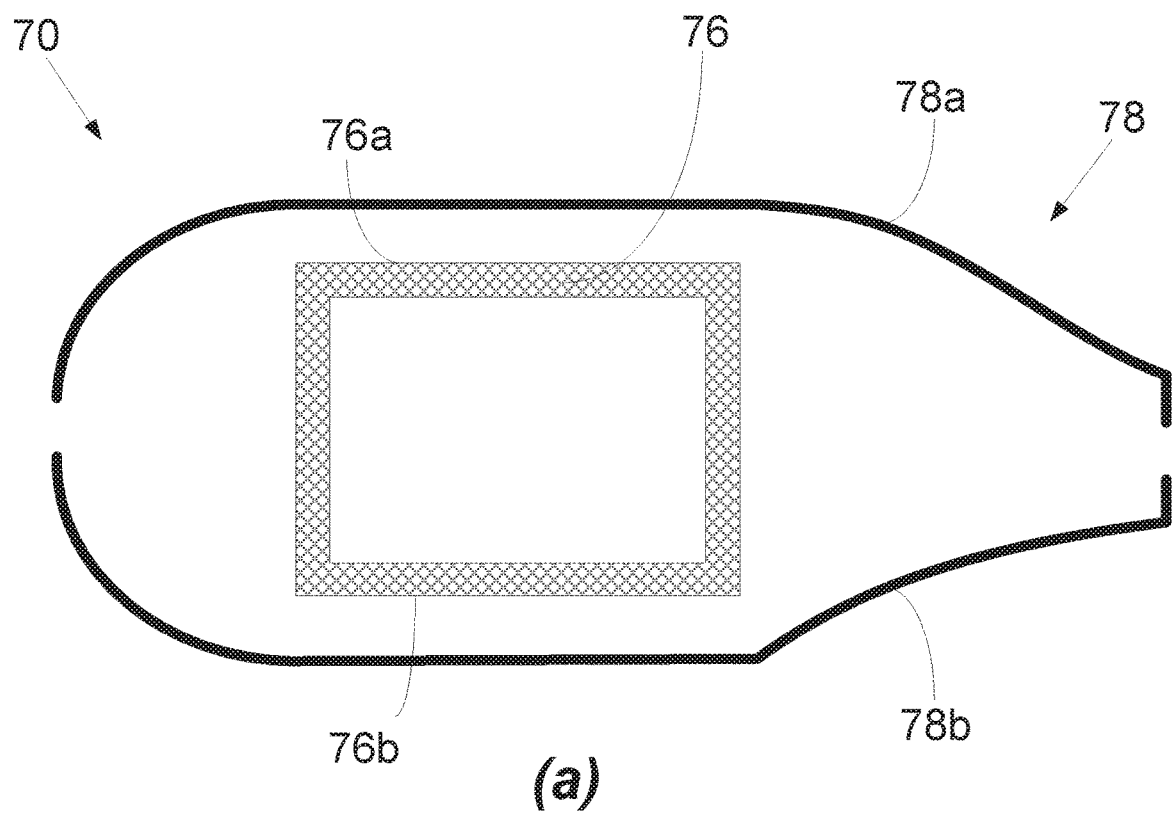
FIG. 6 illustrates a cross-sectional view of embodiments of a root portion of a tribrid blade according to the invention.
Figure 6:
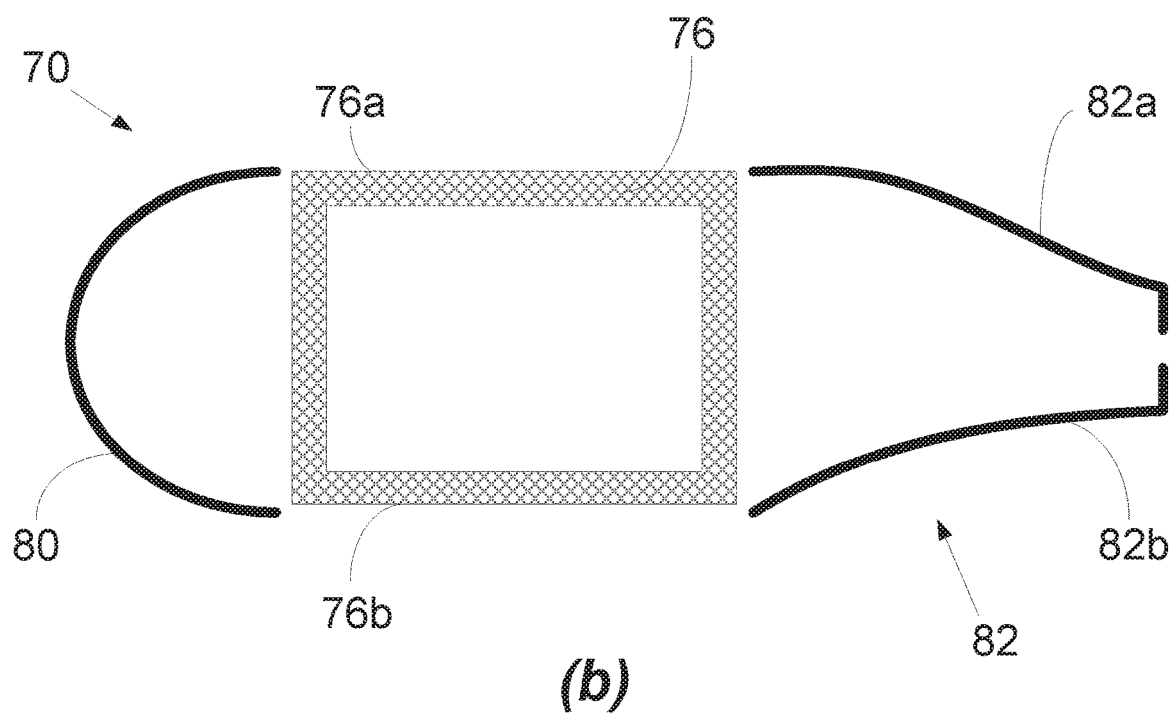
Figure 9:
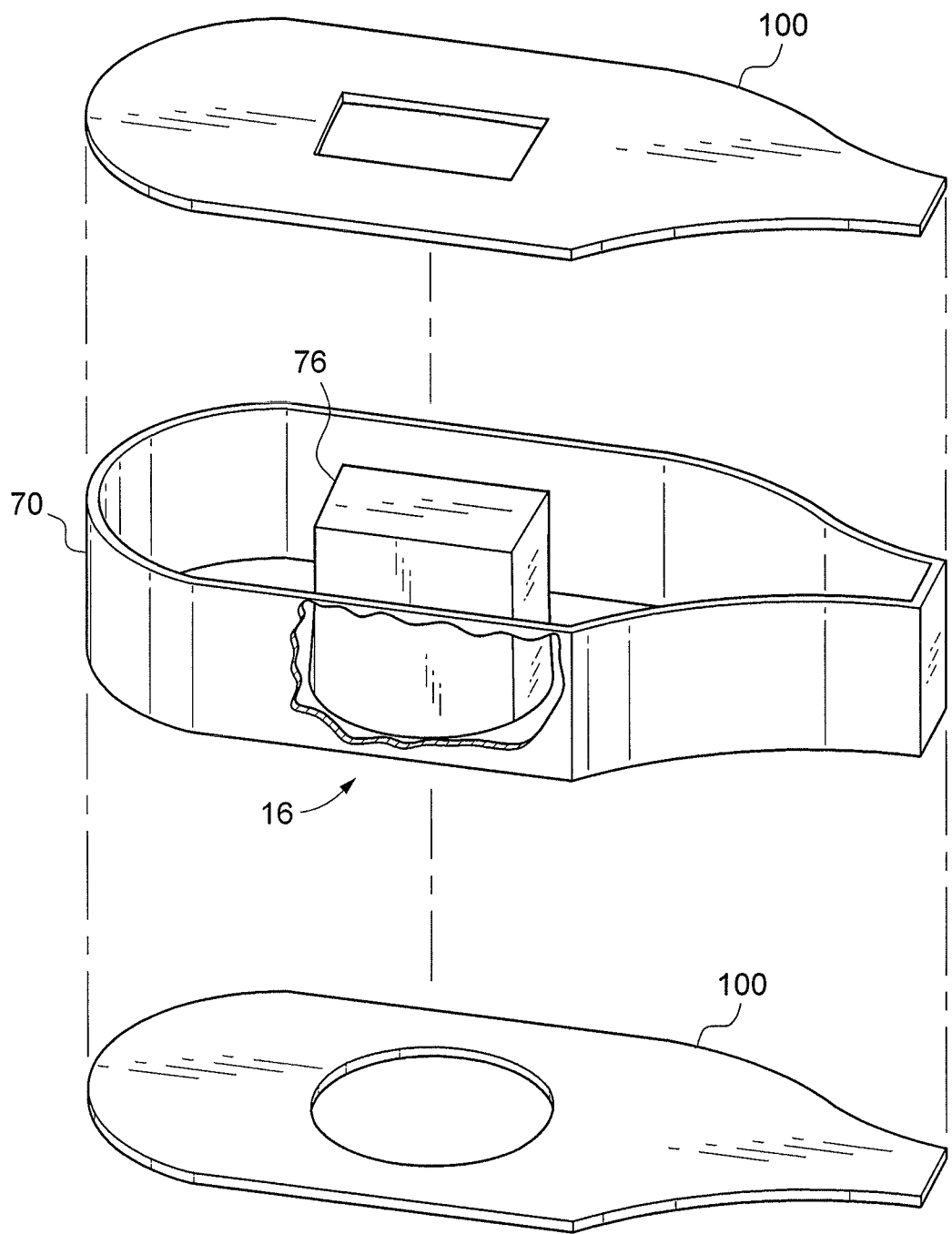
FIG. 9 is a partially exploded, partially cut-away, partial perspective view of the wind turbine blade of FIG. 6.

With reference to FIG. 6, a cross-sectional view is shown of two embodiments of a root portion 70 of a wind turbine blade 10 according to the invention. The root portion 70 comprises a load-bearing spar box or girder 76 which extends substantially along the length of the root portion 70, the spar box having an upper surface 76a and a lower surface 76b and two side surfaces 77 extending therebetween. As shown in FIG. 9, the spar box 76 may have a substantially circular cross-sectional shape at the root end 16, with the spar box 76 transitioning to a substantially rectangular cross-section at the interface between the root portion and the mainboard portion, and which may further taper in cross-sectional dimension as the spar box 76 extends away from the root end 16. The spar box 76 may be formed using any suitable technique, e.g. as a filament-wound spar, a pultruded element or assembly of pultruded elements, etc.

An aerodynamic fairing or shell 78 is fitted to or around the spar box 76, to provide the root portion 70 with an aerodynamic profile. It will be understood that the fairing 78 is substantially non-load-bearing.

In FIG. 6(a), the fairing 78 is provided as a two-part shell, fitted around the exterior of the spar box 76. The fairing 78 of FIG. 6(a) comprises an upper suction-side shell 78a and a lower pressure-side shell 78b. The shells 78a,78b are attached to the spar box 76 by affixing the upper shell 78a to the upper surface 76a of the spar box 76 and affixing the lower shell 78b to the lower surface 76b of the spar box 76, with the shells 78a,78b themselves secured together at the respective leading and trailing edges 18,20 of the blade 10. The shells 78a,78b can be attached to the spar box 76 and/or to each other using any suitable means, e.g. adhesive bonding, bolting, riveting, etc. The secured shells 78a,78b form an aerodynamic profile at the root portion 70 of the blade 10, which may vary along the length of the root portion 70 depending on the aerodynamic requirements of the inboard section of the blade 10.

While FIG. 6(a) illustrates an embodiment wherein the fairing 78 is provided as separate pressure- and suction-side shells, but it will be understood that any other configuration of fairing may be used. For example, the fairing 78 may be formed or cast as a single-piece covering or sheath into which the spar box 76 can be inserted and subsequently secured.

In an alternative embodiment, the fairing 78 may be formed by a first shell substantially forming a blade leading edge and a second shell substantially forming a blade trailing edge, wherein the free ends of the respective shells overlap one another adjacent the respective upper and lower surfaces 76a,76b of the spar box 76. The overlapping ends of the shells may then be secured to each other and to the interiorly-located spar box 76 to form the fairing 78. Such an arrangement provides the advantage of having any bond lines in the fairing located away from the leading edge 18 of the blade 10.

A further embodiment of a root portion 70 of a wind turbine blade 10 according to the invention is illustrated in FIG. 6(b). In this embodiment, the upper and lower surfaces 76a,76b of the spar box 76 form part of the external surface of the root portion 70 of the blade 10, with a first fairing 80 forming a leading edge of the root portion 70 attached to one side of the spar box 76 and a second fairing 82 forming a trailing edge of the root portion 70 attached to the opposed side of the spar box 76. In the embodiment shown in FIG. 6(b) the trailing edge fairing 82 is illustrated as formed from an upper pressure-side half 82a and a separate lower suction-side half 82b, the upper and lower halves 82a,82b arranged to be joined together at the trailing edge 20 of the root portion 70.

It will be understood that the fairing 78,80,82 may be formed from a relatively flexible material, having a plurality of relatively resilient structural ribs 100 located interiorly of the fairing 78,80,82, the ribs 100 acting to provide structural support for the flexible material. The ribs 100 in this case, as shown in the partially-exploded view of FIG. 9, may be securely attached to the spar box 76 to form an inner skeleton structure to support the outer fairing 78,80,82.

Figure 7:
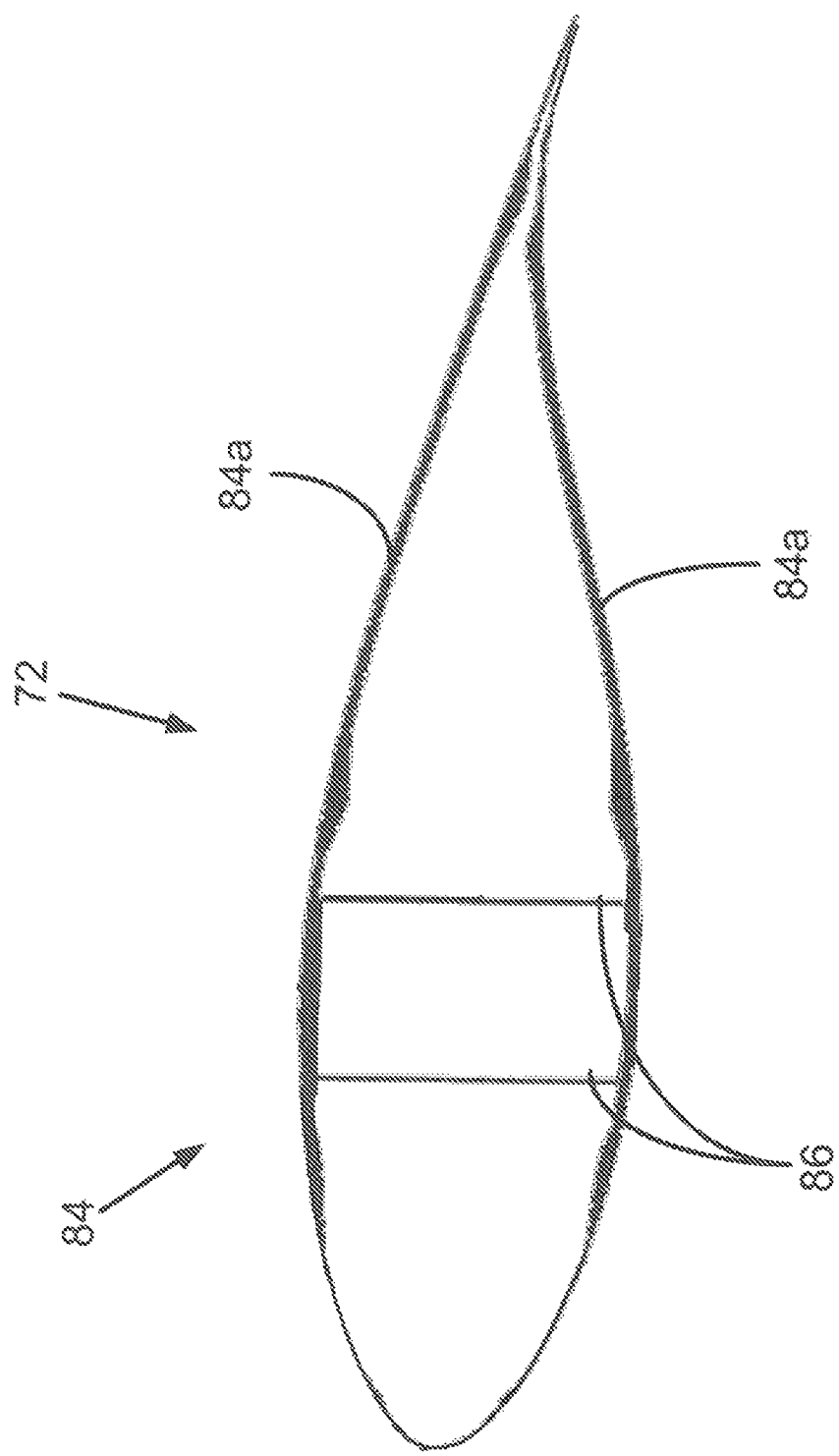
FIG. 7 illustrates a cross-sectional view of an embodiment of a mainboard portion of a tribrid blade according to the invention.

With reference to FIG. 7, a cross-sectional view of a mainboard portion 72 of a blade 10 according to the invention is shown. The mainboard portion 72 comprises a load-bearing blade shell 84, preferably formed from an upper pressure-side blade shell 84a and a lower suction-side blade shell 84b joined together to form the aerodynamic profile of the blade 10. The blade shells 84a,84b are formed by the layup of layers of fibre material, e.g. glass fibre and/or carbon fibre, in an open mould shaped to provide the required form for the aerodynamic shell. The fibre layers are infused with a resin which is allowed to cure and harden to form the required blade shells 84a,84b. The shells can then be closed along the leading and trailing edges of the shells, and joined together using adhesive bond lines for assembly. A pair of shear webs 86 are arranged between the shells 84a,84b prior to closing, to provide shear strength and buckling resistance for the mainboard portion 72.

Figure 8:
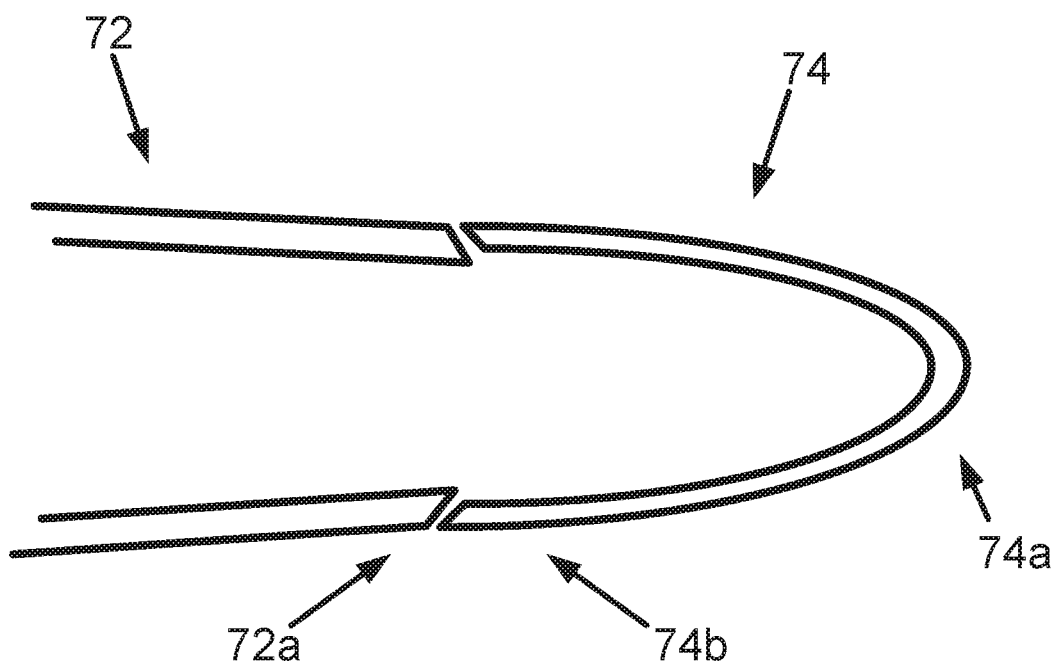
FIG. 8 illustrated a cross-sectional plan view of a tip portion of a tribrid blade according to the invention when attached to a mainboard portion.

With reference to FIG. 8, a plan cross-sectional view of a tip portion 74 of the blade 10 attached to the mainboard portion 72 according to an embodiment of the invention is illustrated. The tip portion 74 is provided as a single piece moulded tip article, having a closed tip end 74a and an open blade end 74b. The open blade end 74b is attached to the distal end 72a of the mainboard portion 72, such that the tip portion 74 forms the tip end 14 of the wind turbine blade 10.

It will be understood that the tip portion 74 may be attached to the mainboard portion 72 using any suitable attachment method, e.g. bolting, adhesive bonding, riveting, etc. In the embodiment shown in FIG. 8, the surfaces of the distal end 72a of the mainboard portion 72 and the open blade end 74b of the tip portion 74 are tapered or chamfered such that the open blade end 74b of the tip portion 74 may be effectively fitted around the distal end 72a of the mainboard portion 72. The dimensions of the respective ends may be selected to ensure a tight fit between the elements. Such a connection between the mainboard and tip portions 72,74 may then be supplemented using any suitable mechanical fixing methods.

As the tip portion 74 is provided as an effective tip cap member which can be fitted over the distal end 72a of the mainboard portion 72, accordingly the open end 74b of the tip portion 74 is relatively wide or flared compared to the remainder of the tip portion 74. Such a construction allows for the tip portion 74 to be formed in a simple integral moulding or one shot process, where the inner mould for such a manufacturing process can be relatively easily removed from the piece through the open blade end 74b without complication.

By providing a wind turbine blade as a tribrid of three separate portions which can be formed using three separate manufacturing approaches, the particular advantages of each approach can be utilised for those areas of the blade where such effects can be best utilised. For the root portion, a central load-bearing spar can be specifically designed and constructed to effectively absorb and transfer the considerable forces and bending moments experienced at the root end of a blade during operation. For the mainboard portion, the use of a load-bearing shell construction allows for the majority of the blade structure to be manufactured using a relatively simple and tested process. For the tip portion, the provision of a tip element from an integral-moulding process means that the use of adhesive in the tip end of the blade can be minimised, reducing the effective weight of the blade tip end.

In an alternative configuration, there is provided a wind turbine blade having a primary portion formed from a load-bearing aerodynamic shell structure, similar to as described above, wherein the blade further comprises a tip portion formed as an integrally-formed tip element, as described above. The primary portion extends from the root end of the blade, to an interface with the tip portion. Preferably, the primary portion forms at least approximately the inner 0-50% of the total length of the wind turbine blade, taken from the root end of the blade, with the tip portion forming the outer remaining portion of the wind turbine blade.

The invention is not limited to the embodiments described herein, and may be modified or adapted without departing from the scope of the present invention.

The invention claimed is:

1. A wind turbine blade comprising a root portion, a mainboard portion, and a tip portion,
   wherein the root portion comprises at least one load-bearing spar structure having at least one non-load-bearing aerodynamic fairing coupled to said at least one load-bearing spar structure,
   wherein the mainboard portion comprises a load-bearing aerodynamic shell, the load-bearing aerodynamic shell having a suction-side blade shell and a pressure-side blade shell, the suction-side blade shell comprising a load-bearing main laminate integral to the suction-side blade shell, the pressure-side blade shell comprising a load-bearing main laminate integral to the pressure-side blade shell, wherein at least one shear web extends between an internal surface of the load-bearing main laminate of the suction-side blade shell and an internal surface of the load-bearing main laminate of the pressure-side blade shell, and
   wherein the tip portion comprises an integrally-formed tip element formed as a one-piece shell from an integral molding process,
   wherein the root portion, the mainboard portion and the tip portion are manufactured as individual and separate portions with respect to one another, the root portion, the mainboard portion and the tip portion being individually and distinctly attached to one another to form the blade.

2. The blade as claimed in claim 1, wherein said root portion forms an inner length of a total length of the blade, taken from a root end of the blade, wherein the inner length is greater than 0% and less than or equal to 33%.

3. The blade as claimed in claim 1, wherein said mainboard portion forms between 33% and 97% of a total length of the blade.

4. The blade as claimed in claim 3, wherein said mainboard portion forms a middle 33-85% of the length of the blade taken from the root end thereof.

5. The blade as claimed in claim 1, wherein said tip portion forms an outer 3% to 15% of the length of the blade, taken from a root end of the blade.

6. The blade as claimed in claim 5, wherein said tip portion forms the outer 3% of the length of the blade, taken from the root end of the blade.

7. The blade as claimed in claim 1, wherein said mainboard portion forms a middle ⅓ of a total length of the blade, and wherein said tip portion forms an outer ⅓ of the total length of the blade.

8. The blade as claimed in claim 1, wherein the at least one load-bearing spar structure of the root portion comprises a load-bearing central spar, wherein said load-bearing central spar comprises a circular cross-sectional shape at a root end of the blade, said load-bearing central spar transitioning to a rectangular cross-sectional shape at an interface between the root portion and the mainboard portion.

9. The blade as claimed in claim 1, wherein the at least one load-bearing spar structure of the root portion comprises a load-bearing internal spar having at least one external aerodynamic shell fitted to the exterior of said load-bearing internal spar, said at least one external aerodynamic shell defining a substantially closed shell extending about the load-bearing internal spar.

10. The blade as claimed in claim 9, wherein the root portion comprises a plurality of rib elements mounted to said at least one load-bearing spar structure, wherein said at least one external aerodynamic shell is supported by said plurality of rib elements.

11. The blade as claimed in claim 10, wherein said plurality of rib elements comprises a plurality of leading edge ribs and/or a plurality of trailing edge ribs, wherein the plurality of rib elements are shaped to present an outline of a portion of a desired aerodynamic shape for the root portion of the blade.

12. The blade as claimed in claim 11, wherein said at least one external aerodynamic shell is formed as a flexible material, said at least one external aerodynamic shell being supported by said plurality of rib elements to define an aerodynamic profile.

13. The blade as claimed in claim 1, wherein the at least one load-bearing spar structure of the root portion comprises a load-bearing central spar having an aerodynamic leading edge shell and/or an aerodynamic trailing edge shell fitted to said load-bearing central spar, wherein a portion of said load-bearing central spar forms part of an exterior surface of the blade.

14. The blade as claimed in claim 1, wherein said tip portion comprises an integrally-formed aerodynamic tip shell.

15. The blade as claimed in claim 14, wherein said tip portion comprises a cap-like shape having a first open end and a distal tip end, said first open end having an opening tapering or narrowing towards said distal tip end.

16. The blade as claimed in claim 15, wherein said mainboard portion comprises a connecting section located at an outer end of said mainboard portion, wherein said connecting section is shaped to couple with said first open end of said tip portion, and wherein a portion of said connecting section is chamfered or tapered such that said first open end of said tip portion is fitted to said connecting section.

17. The blade as claimed in claim 1, wherein said mainboard portion is formed from at least two load-bearing blade shell sections coupled together to form an aerodynamic blade shell.

18. A wind turbine comprising at least one wind turbine blade as claimed in claim 1.

19. The blade as claimed in claim 1, wherein the at least one shear web is selected from the group consisting of an I-web and a C-web.

\* \* \* \* \*